US012217682B2

(12) United States Patent
Kim et al.

(10) Patent No.: US 12,217,682 B2

(45) Date of Patent: Feb. 4, 2025

(54) LIGHT EMITTING DISPLAY APPARATUS

(71) Applicant: LG Display Co., Ltd., Seoul (KR)

(72) Inventors: TaeWoo Kim, Paju-si (KR); DongJin Jeong, Paju-si (KR); Hongseok Choi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/383,734

(22) Filed: Oct. 25, 2023

(65) Prior Publication Data

US 2024/0221648 A1 Jul. 4, 2024

(30) Foreign Application Priority Data

Dec. 29, 2022 (KR) ........................ 10-2022-0189066

(51) Int. Cl.
*G09G 3/3233* (2016.01)

(52) U.S. Cl.
CPC ... *G09G 3/3233* (2013.01); *G09G 2300/0842* (2013.01); *G09G 2320/045* (2013.01); *G09G 2320/0613* (2013.01); *G09G 2320/0626* (2013.01); *G09G 2320/103* (2013.01); *G09G 2354/00* (2013.01)

(58) Field of Classification Search
CPC ............ G09G 3/20; G09G 5/00; G09G 5/003; G09G 2310/0245; G09G 2320/0257; G09G 2320/046; G09G 2320/08; G09G 2320/103; G09G 2360/18
See application file for complete search history.

(56) References Cited

U.S. PATENT DOCUMENTS

| | | | | |
|---|---|---|---|---|
| 2020/0074911 | A1* | 3/2020 | Park | H04N 13/122 |
| 2020/0111455 | A1* | 4/2020 | Lee | G09G 3/2007 |
| 2020/0372860 | A1* | 11/2020 | Kim | G09G 3/3225 |

FOREIGN PATENT DOCUMENTS

| | | | |
|---|---|---|---|
| JP | 2003-280592 | A | 10/2003 |
| JP | 2006-163091 | A | 6/2006 |
| JP | 2007-108404 | A | 4/2007 |
| JP | 2014-26003 | A | 2/2014 |
| JP | 2015-158684 | A | 9/2015 |
| KR | 10-2020-0050584 | A | 5/2020 |

* cited by examiner

*Primary Examiner* — Nelson M Rosario

(74) *Attorney, Agent, or Firm* — Birch, Stewart, Kolasch & Birch, LLP

(57) ABSTRACT

A light emitting display apparatus includes a control driver configured to perform a deterioration prevention function, a scaler configured to transfer a deterioration prevention function activation request signal to the control driver and transfer a deterioration prevention function deactivation request signal to the control driver based on an analysis result of input image data when deterioration prevention function start information is received from the control driver, and a light emitting display panel configured to display images under the control of the control driver.

19 Claims, 7 Drawing Sheets

LIGHT EMITTING DISPLAY APPARATUS

CROSS-REFERENCE TO RELATED APPLICATIONS

This application claims priority to Korean Patent Application No. 10-2022-0189066 filed in the Republic of Korea on Dec. 29, 2022, the entire disclosure of which is hereby expressly incorporated by reference into the present application.

BACKGROUND

Field of the Invention

The present disclosure relates to a light emitting display apparatus with an improved deterioration prevention function.

Discussion of the Related Art

Light emitting display apparatuses are used in electronic products such as televisions, monitors, notebook computers, smart phones, tablet computers, electronic pads, wearable devices, watch phones, portable information devices, navigation devices, or vehicle control display apparatus to perform a function of displaying images.

For example, a light emitting display apparatus can be used as a television, a monitor, or various kind of electronic products. In some cases, the light emitting display apparatus can be used as multiple devices such as a TV and a monitor. However, when the display apparatuses are used in a variety manner, some limitations associated with the performance of the display apparatuses can arise.

SUMMARY OF THE DISCLOSURE

When a light emitting display apparatus is used for a long time, the performance of the light emitting display apparatus can be degraded due to deterioration of the light emitting apparatus. In order to address such a limitation, deterioration prevention functions for preventing deterioration of light emitting devices can be used in light emitting display apparatuses.

The inventors of the present disclosure recognized a limitation that when a light emitting display apparatus made for a television is used for a monitor, it can be challenging and difficult to apply previously used deterioration prevention functions.

For example, in a light emitting display apparatus made for television, small movements such as a movement of a mouse cursor is ignored and thus, even when the mouse cursor is moved by a user after the luminance of a light emitting display panel may be reduced, the luminance of the light emitting display panel cannot be changed back to a normal luminance.

Therefore, the inventors of the present disclosure have invented a structure which can prevent a performance deterioration of a light emitting display apparatus due to a deterioration of light emitting devices, and particularly, have invented a light emitting display apparatus which can be used as both a television and a monitor (or other ways) and in which a deterioration prevention function can be normally and properly executed.

Accordingly, the present disclosure is directed to providing a light emitting display apparatus that substantially obviates one or more problems due to limitations and disadvantages of the related art.

An aspect of the present disclosure is directed to providing a light emitting display apparatus in which a scaler can deactivate a deterioration prevention function of a control driver based on analysis results of input image data after the deterioration prevention function starts in the control driver.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these and other advantages and in accordance with the purpose of the disclosure, as embodied and broadly described herein, there is provided a light emitting display apparatus including a control driver configured to perform a deterioration prevention function, a scaler configured to transfer (or transmit) a deterioration prevention function activation request signal to the control driver and transfer (or transmit) a deterioration prevention function deactivation request signal to the control driver based on an analysis result of input image data when deterioration prevention function start information is received from the control driver, and a light emitting display panel configured to display images under the control of the control driver.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
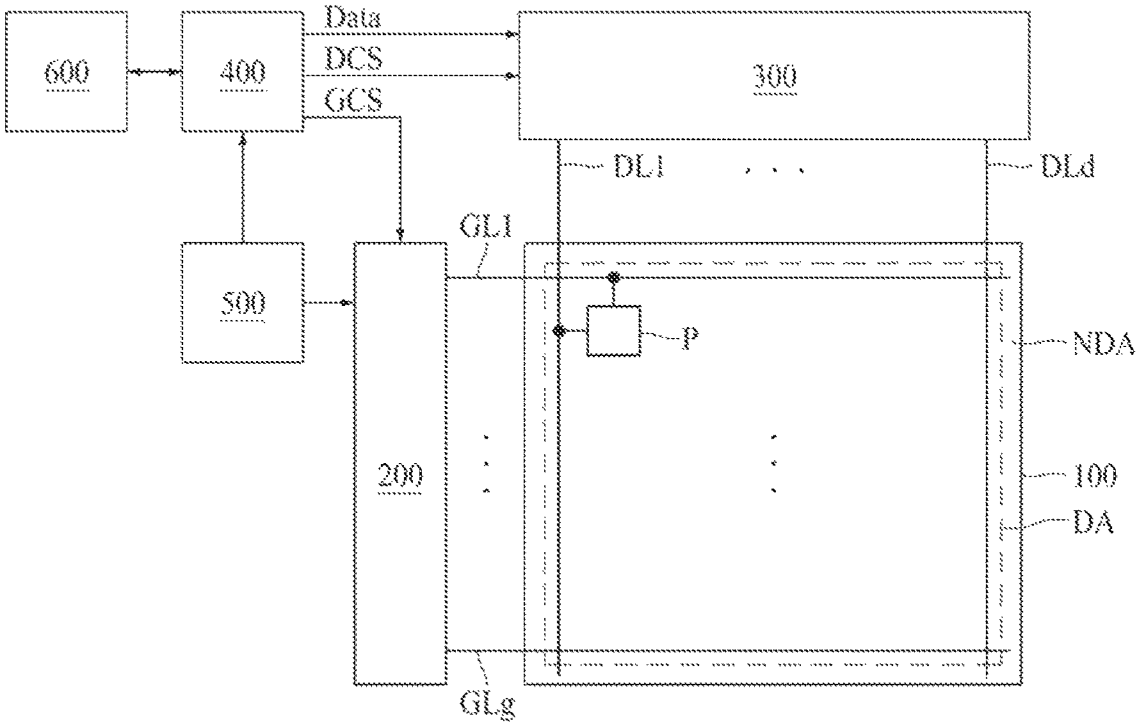
FIG. 1 is an example diagram illustrating a configuration of a light emitting display apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When terms such as "comprise," "have," "include," etc. described in the present specification are used, another part can be added unless "only" is used. The terms of a singular form can include plural forms unless referred to the contrary. Further, the term "exemplary" can be interchangeably used with the term "example" and can have the same or similar meaning as the term "example."

In construing an element, the element is construed as including an error or tolerance range although there is no explicit description of such an error or tolerance range.

In describing a position relationship, for example, when a position relation between two parts is described as, for example, "on," "above," "over," "under," and "next," one or more other parts can be disposed between the two parts unless a more limiting term, such as "just" or "direct(ly)" is used.

In describing a time relationship, for example, when the temporal order is described as, for example, "after," "subsequent," "next," and "before," a case that is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another, and may not define order or sequence. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings. All the components of each light emitting display apparatus according to all embodiments of the present disclosure are operatively coupled and configured.

Figure 2:
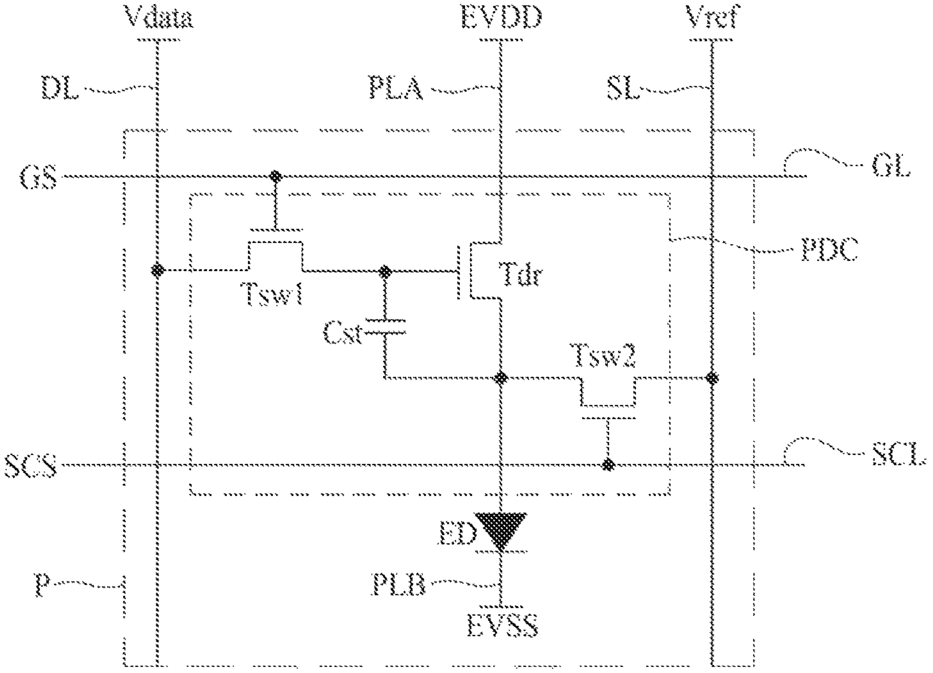
FIG. 2 is an example diagram illustrating a structure of a pixel applied to a light emitting display apparatus according to an embodiment of the present disclosure.
Figure 3:
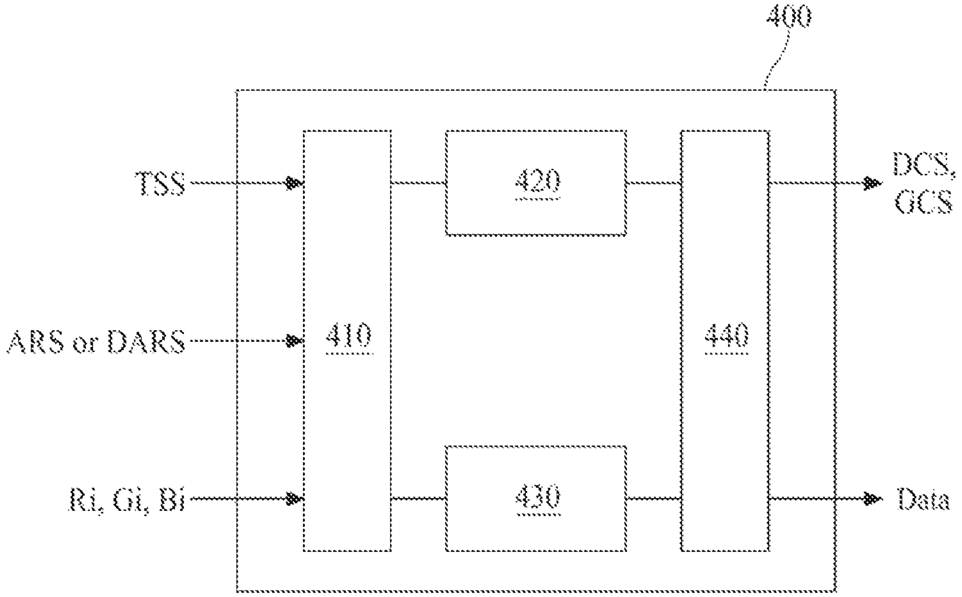
FIG. 3 is an example diagram illustrating a structure of a control driver applied to a light emitting display apparatus according to an embodiment of the present disclosure.
Figure 4:
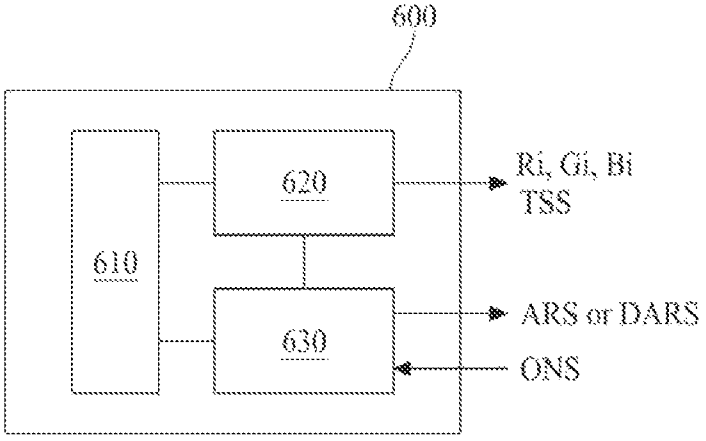
FIG. 4 is an example diagram illustrating a structure of a scaler applied to a light emitting display apparatus according to an embodiment of the present disclosure.
Figure 5:
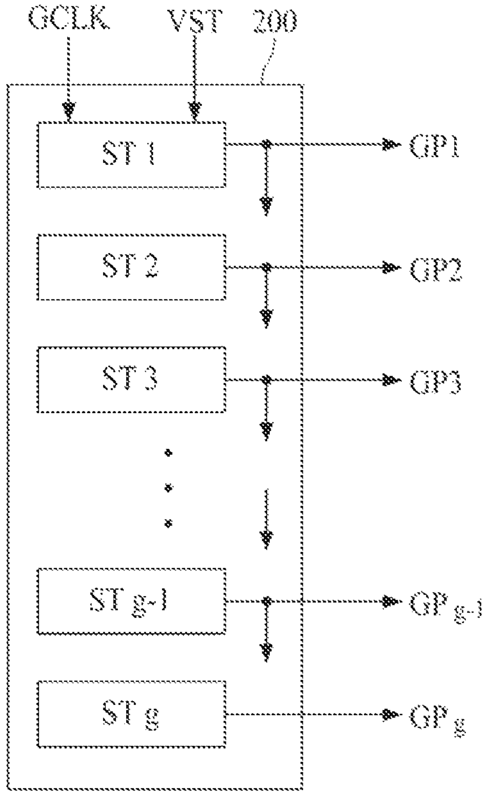
FIG. 5 is an example diagram illustrating a structure of a gate driver applied to a light emitting display apparatus according to an embodiment of the present disclosure.
Figure 6:
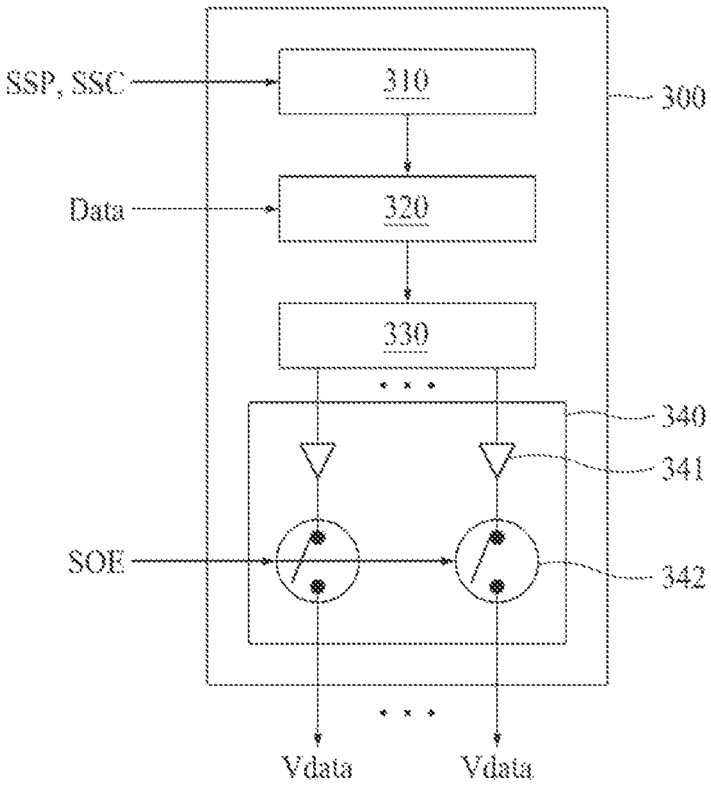
FIG. 6 is an example diagram illustrating a structure of a data driver applied to a light emitting display apparatus according to an embodiment of the present disclosure.

FIG. 1 is an example diagram illustrating a configuration of a light emitting display apparatus according to an embodiment of the present disclosure, FIG. 2 is an example diagram illustrating a structure of a pixel applied to a light emitting display apparatus according to an embodiment of the present disclosure, FIG. 3 is an example diagram illustrating a structure of a control driver applied to a light emitting display apparatus according to an embodiment of the present disclosure, FIG. 4 is an example diagram illustrating a structure of a scaler applied to a light emitting display apparatus according to an embodiment of the present disclosure, FIG. 5 is an example diagram illustrating a structure of a gate driver applied to a light emitting display apparatus according to an embodiment of the present disclosure, and FIG. 6 is an example diagram illustrating a structure of a data driver applied to a light emitting display apparatus according to an embodiment of the present disclosure.

The light emitting display apparatus according to one or more embodiments of the present disclosure can be used as various kinds of electronic devices. The electronic devices can be, for example, a television (TV) and a monitor. For instance, the light emitting display apparatus can be any electronic device (e.g., smart TV, etc.) which can be adapted to be provide merely a display function (e.g., as a monitor or screen). In an example, a user can connect the user's laptop or smart phone to the light emitting display apparatus to use the light emitting display apparatus as a screen for the laptop or smart phone. Further, the light emitting display apparatus can be flexible and/or provide various functions including a touch function.

Referring to FIGS. 1 and 2, the light emitting display apparatus according to an embodiment of the present disclosure can include a light emitting display panel 100 which includes a display area DA for displaying an image and a non-display area NDA provided outside or adjacent to the display area DA, a gate driver 200 which supplies gate signals to a plurality of gate lines GL1 to GLg provided in the display area DA of the light emitting display panel 100, a data driver 300 which supplies data voltages (data signals) to a plurality of data lines DL1 to DLd provided in the light emitting display panel 100, a control driver 400 which controls driving of the gate driver 200 and the data driver 300, a scaler 600 for converting various image information received through a communication network or other means into input image data that the control driver 400 can recognize, and a power supply 500 which supplies power to the control driver 400, the gate driver 200, the data driver 300 and the light emitting display panel 100.

In the light emitting display panel 100, the gate lines GL1 to GLg, the data lines DL1 to DLd, and a plurality of pixels P are provided in the display area DA. The plurality of pixels P can be arranged in a matrix configuration or other suitable configuration. Accordingly, an image is output in the display area DA. Here, g and d are natural numbers and can be integers greater than 1. The non-display area NDA surrounds the outer periphery of the display area DA completely or in part.

Each pixel P of the light emitting display panel 100 of FIG. 1 can have the configuration shown in FIG. 2, but can have other configurations. The pixel P included in the light emitting display panel 100, as illustrated in FIG. 2, can include a pixel driving circuit PDC which includes a switching transistor Tsw1, a storage capacitor Cst, a driving transistor Tdr, and a sensing transistor Tsw2, and a light emitting device ED connected to the pixel driving circuit PDC. The light emitting device ED can be an organic light emitting diode.

A first terminal of the driving transistor Tdr can be connected to a first voltage supply line PLA through which a first voltage EVDD is supplied, and a second terminal of the driving transistor Tdr can be connected to the light emitting device ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied through the data line DL from the data driver 300. A gate signal GS can be supplied through the gate line GL from the gate driver 200. The gate signal GS can include a gate pulse GP for turning on the switching transistor Tsw1 and a gate-off signal for turning off the switching transistor Tsw1.

The sensing transistor Tsw2 can be provided for measuring a threshold voltage or mobility of the driving transistor Tdr, or for suppling a reference voltage Vref to the pixel driving circuit PDC. A first terminal of the sensing transistor Tsw2 can be connected to a second terminal of the driving transistor Tdr and the light emitting device ED, a second terminal of the sensing transistor Tsw2 can be connected to the sensing line SL through which the reference voltage Vref is supplied, and a gate of the sensing transistor Tsw2 can be connected to a sensing control line SCL through which a sensing control signal SCS is supplied.

The sensing line SL can be connected to the data driver 300, or can be connected to the power supply 500 through the data driver 300. For example, the reference voltage Vref supplied from the power supply 500 can be supplied to the pixels P through the sensing line SL, and data sensing signals transferred through the sensing line SL from the pixels can be processed by the data driver 300.

The light emitting device ED can include a first electrode supplied with a first voltage EVDD through the driving transistor Tdr, a second electrode connected to a second voltage supply line PLB supplied with a second voltage EVSS, and a light emitting layer provided between the first electrode and the second electrode.

A structure of each pixel P applied to various embodiments of the present disclosure is not limited to the structure illustrated in FIG. 2. Accordingly, the structure of the pixel P can be changed to various shapes and configurations.

Referring to FIG. 3, the control driver 400 can realign input image data Ri, Gi, and Bi transferred from the scaler 600 by using a timing synchronization signal TSS transferred from the scaler 600 and can generate data control signals DCS which are to be supplied to the data driver 300 and gate control signals GCS which are to be supplied to the gate driver 200.

More specifically, the control driver 400 can include a data aligning portion 430 which realigns (e.g., converts) the input image data Ri, Gi, and Bi to generate image data Data and supplies the image data Data to the data driver 300, a control signal generating portion 420 which generates the gate control signal GCS and the data control signal DCS by using the timing synchronization signal TSS, a control portion 410 which receives the timing synchronization signal TSS and the input video data Ri, Gi, and Bi transferred from the scaler 600 and transfers the timing synchronization signal and the input video data to the data aligning portion 430 and the control signal generating portion 420, and an output portion 440 which supplies the data driver 300 with the image data generated by the data aligning portion 430 and the data control signal DCS generated by the control signal generating portion 420 and supplies the gate driver 200 with the gate control signal GCS generated by the control signal generating portion 420.

The control signal generating portion 420 can generate a power control signal supplied to the power supply 500.

The control driver 400 can include a storage portion for storing various information. The storage portion (e.g., memory) can be included in the control driver 400 or can be provided separately from the control driver 400 and provided independently.

Further, the control driver 400 can execute various types of deterioration prevention functions. For example, when still images are displayed on the light emitting display panel 100, the control driver 400 can execute a Temporal Peak Luminance Control (TPC) function capable of lowering the luminance of lights output from the light emitting display panel 100.

To this end, the control portion 410 of the control driver 400 can analyze the input image data Ri, Gi, and Bi, and determine whether the input image data Ri, Gi, and Bi corresponding to a still image (e.g., non-moving image or content) are inputted for a preset period. For instance, the still image can mean an image output from the light emitting display panel 100, and particularly, an image such as a picture which is stopped or still. For instance, because images are output and displayed on the light emitting display panel according to the input image data Ri, Gi, and Bi, whether or not such image is a still image can be determined by analyzing the input image data Ri, Gi, and Bi, which can be done by the control portion 410.

When the control portion 410 determines that input image data Ri, Gi, and Bi correspond to still images as a result of analyzing the input image data Ri, Gi, and Bi included in at least two frames, the control portion 410 can control the data aligning portion 430 to lower the luminance value of each of the input image data Ri, Gi, and Bi. Image data Data with such reduced luminance values can then be generated and be transferred out to the data driver 300, where the image data Data can be converted into data voltages Vdata in the data driver 300 and supplied to the pixels P provided in the light emitting display panel 100.

When the luminance value of each of the image data Data is reduced, the current supplied to the light emitting devices ED provided in the pixels P is reduced and thus, the luminance of the light output from the light emitting devices EDs can be reduced. Accordingly, luminance of still images output from the light emitting display panel 100 can be reduced, e.g., according to the TPC function in order to minimize or prevent deterioration in the light emitting display panel 100.

For instance, when the current supplied to the light emitting devices ED is reduced and thus, the luminance of the light output from the light emitting devices ED is reduced, the speed at which the light emitting devices ED can deteriorate can be reduced.

Therefore, the deterioration rate of the light emitting devices ED can be reduced by performing the TPC function as described above, thereby preventing or minimizing the quality of the light emitting display panel from being degraded due to the deterioration (or overuse) of the light emitting devices ED.

Moreover, as a result of analyzing the input image data Ri, Gi, and Bi included in at least two frames, when it is determined that the input image data Ri, Gi, and Bi corresponding to still images are input for a preset period, the control portion 410 can control the power supply 500 to reduce a level of the first voltage EVDD supplied to the pixels P.

In this case, when the level of the first voltage EVDD is reduced, the level of the current supplied to the pixels P can be overall reduced. Therefore, the current supplied to the light emitting devices ED is reduced, and the luminance of the light output from the light emitting devices EDs is reduced, thereby reducing the speed at which the light emitting devices ED may deteriorate or wear out.

Therefore, the deterioration rate of the light emitting devices ED can be reduced by performing the TPC function as described above, thereby preventing the quality of the light emitting display panel from being degraded due to the deterioration of the light emitting devices ED Moreover, the control driver 400 can execute a Logo Extraction Algorithm (LEA) function which can lower the luminance of any light output in an area corresponding to a logo (e.g., area where a logo is displayed) when the logo is output from (displayed on) the light emitting display panel 100.

To this end, the control portion 410 of the control driver 400 can analyze input image data Ri, Gi, and Bi to determine whether or not the input image data Ri, Gi, and Bi corresponding to an image including a logo (or the like) is inputted (e.g., received by the scaler 600 or the display apparatus). Here, the logo can include or be formed of a character or a figure, and can be a still image that does not change for a long time (or any set time). The image including the logo can mean an image output from the light emitting display panel 100. For example, because images are output from (displayed on) the light emitting display panel by input image data Ri, Gi, and Bi, an image including a logo can be determined by analyzing the input image data Ri, Gi, and Bi. For example, if the input image data Ri, Gi, and Bi for pixels P corresponding to a specific area on the display area DA of the light emitting display panel 100 are not continuously changed, the control portion 410 can determine that a logo is displayed or is to be displayed in that specific area of the display area DA.

For instance, when the control portion 410 determines that input image data Ri, Gi, and Bi corresponding to images including logo(s) are inputted as a result of analyzing the input image data Ri, Gi, and Bi included in at least two frames, the control portion 410 can control the data aligning portion 430 to lower the luminance value of each of the input image data Ri, Gi, and Bi corresponding to the logo. Image data Data with such reduced luminance values can then transferred out by the output portion 440 to the data driver 300, and the image data Data can be converted into data voltages Vdata in the data driver 300 and supplied to the pixels P provided in the light emitting display panel 100 for displaying the image data Data.

In this case, when the luminance value of each of image data Data corresponding to the logo is reduced, the current supplied to the light emitting devices ED provided in the pixels P corresponding to the logo can be reduced, thereby reducing the luminance of the light output from the light emitting devices ED corresponding to the logo. Accordingly, the luminance of the logo output on the light emitting display panel 100 can be reduced by performing the LEA function.

In other words, when the current supplied to the light emitting devices EDs corresponding to the logo area is reduced and the luminance of the light output from the light emitting devices ED corresponding to the logo area is reduced, the speed at which the light emitting devices EDs corresponding to the logo area deteriorate can be reduced. If the deterioration rate of the light emitting devices ED provided in a specific area (e.g., logo displaying area) of the light emitting display panel 100 is reduced, the overall deterioration rate of the light emitting display apparatus can be reduced.

Therefore, the deterioration rate of the light emitting devices ED can be reduced by the LEA function as described above, thereby preventing the quality of the light emitting display apparatus from being degraded and prolonging the use of the light emitting display apparatus.

In addition to the deterioration prevention functions such as the TPC and LEA functions described above, at least one of various types of deterioration prevention functions currently used can be executed in the control driver 400. Further, the characteristics of the present disclosure are not to be focused merely in the deterioration prevention function itself executed in the control driver 400 and the structure of the control driver 400 for this purpose. Accordingly, a detailed description of each of the deterioration prevention functions will be omitted or may be provided briefly.

Referring to FIG. 4, the scaler 600 can perform a function of driving the control driver 400 and the electronic device including the display apparatus of the present disclosure.

For example, when the electronic device is a TV, the scaler 600 can receive various sound information, image information, and letter information over a communication network (or another device) and can transfer the received image information to the control driver 400.

In another application, when the electronic device (e.g., TV) is operating as a monitor, the scaler 600 can receive image information over a communication network (or another device) connected to a computer or smart phone and can convert the received image information into input image data Ri, Gi, and Bi and transfer the input image data to the control driver 400.

For example, the scaler 600 can convert image information received through the communication network into a signal recognized by the control driver 400. In this case, the signal recognized by the control driver 400 can be input image data Ri, Gi, and Bi. For example, the scaler 600 can convert image information into input image data Ri, Gi, and Bi, and such input image data Ri, Gi, and Bi can be transferred to the control driver 400.

In addition to the input image data Ri, Gi and Bi, the scaler 600 can transfer a deterioration prevention function activation request signal ARS to the control driver 400 which executes a deterioration prevention function (e.g., TPC, LEA, etc.). When the deterioration prevention function activation request signal ARS is received from the scaler 600, the control driver 400 can prevent deterioration of the light emitting display apparatus by executing the deterioration prevention function as described above.

As discussed above, the control driver 400 can analyze the input image data Ri, Gi, and Bi when the deterioration prevention function is activated. For instance, when input image data Ri, Gi, and Bi corresponding to still images or logs are received, the control driver 400 can reduce the overall luminance of the pixels P and/or reduce the luminance of the pixels P only in an area where the logo is displayed.

When the luminance of the entire pixels P or the luminance of the pixels P corresponding to the logo area is reduced, the control driver 400 can transfer deterioration prevention function start information ONS to the scaler 600.

For example, when the deterioration prevention function is activated in the control driver 400 by the deterioration prevention function activation request signal ARS received from the scaler 600, the input image data Ri, Gi, and Bi can be analyzed in the control driver 400. When the luminance of the entire pixel P or the luminance of the pixels P corresponding to the logo area decreases on the basis of the analysis results, the control driver 400 can generate and transfer the deterioration prevention function start information ONS to the scaler 600. The deterioration prevention function start information ONS can include information or signals indicating that the deterioration prevention function has been activated, and/or the type of the deterioration prevention function that has been activated.

When the deterioration prevention function start information ONS is received from the control driver 400, the scaler 600 transfers a deterioration prevention function deactivation request signal DARS to the control driver 400 on the basis of an analysis result of the input image data Ri, Gi, and Bi by the scaler 600.

To this end, as illustrated in FIG. 4, the scaler 600 can include an image information receiver 610 which receives image information, a conversion portion 620 which converts the image information into input image data Ri, Gi, and Bi, and an analyzing portion 630. The analyzing portion 630 can generate and transfer a deterioration prevention function activation request signal ARS to the control drive 400, and can generate and transfer a deterioration prevention function deactivation request signal DARS to the control driver 400 based on the analysis results when the deterioration prevention function start information ONS is received from the control driver 400.

The image information receiver 610 can receive image information through a communication network or other means as described above. For example, if the electronic device (including or being the display apparatus of the present disclosure) is or functions as a television TV, the scaler 600 of the display apparatus can receive image information through a communication network, whereas if the electronic device is or functions as a monitor, the scaler 600 can receive image information through a communication network connected to a computer or other device.

The conversion portion 620 can convert image information into input image data Ri, Gi, and Bi, and can transfer the input image data Ri, Gi, and Bi to the control driver 400.

The conversion portion 620 can also generate a timing synchronization signal TSS and transfer the timing synchronization signal TSS to the control driver 400.

When power is supplied to the light emitting display apparatus and the control driver 400 is driven, the analyzing portion 630 can generate a deterioration prevention function activation request signal ARS and transfer it to the control driver 400. Accordingly, a deterioration prevention function (e.g., TPC, LEA, etc.) can be executed in the control driver 400.

During the deterioration prevention function is performed, the control driver 400 generates the deterioration prevention function start information ONS, which is then received by the scaler 600. When the deterioration prevention function start information ONS is received, the analyzing portion 630 can analyze input image data Ri, Gi, and Bi. In this case, the analyzing portion 630 can analyze input image data Ri, Gi, and Bi generated by the conversion portion 620, but can also analyze image information transferred from the image information receiver 610. Hereinafter, for convenience of description, the scaler 600 which analyzes input image data Ri, Gi, and Bi generated by the conversion portion 620 will be described as an example of a light emitting display apparatus according to the present disclosure.

When it is determined to be necessary to increase the luminance of the image reduced by the deterioration prevention function to the normal luminance as a result of analyzing input image data Ri, Gi, and Bi, the analyzing portion 630 can transfer a deterioration prevention function deactivation request signal DARS to the control driver 400.

Accordingly, the control portion 410 can control at least one of the data aligning portion 430 and the control signal generating portion 420 so that the luminance of the image reduced by the deterioration prevention function can now be increased to the luminance of a normal state.

For example, on the basis of the control of the control portion 410, the data aligning portion 430 can generate image data Data with the same level of luminance as the input image data Ri, Gi, and Bi and transfer it to the data driver 300.

Moreover, on the basis of the control of the control portion 410, the control signal generating portion 420 can generate a power control signal by which the level of the reduced first voltage EVDD is increased and supply it to the power supply 500.

Accordingly, the luminance of the entire light emitting display panel or the luminance of the logo area can be increased to the luminance corresponding to the input image data Ri, Gi, and Bi. As a result, in response to the deterioration prevention function deactivation request signal DARS, the luminance of the entire light emitting display panel or a portion thereof can be increased and return to be at a normal level of luminance (e.g., when the deterioration prevention function is not performed or activated).

Further, when a preset period elapses after the scaler 600 transfers the deterioration prevention function deactivation request signal DARS to the control driver 400, the scaler 600 can generate and transfer a deterioration prevention function activation request signal ARS to the control driver 400 again. Accordingly, the control driver 400 can execute the deterioration prevention function again, if needed. This process of switching between the stages of ARS and DARS can be repeated as needed.

The power supply 500 can generate various power and can supply the generated power to the control driver 400, the gate driver 200, the data driver 300, and the light emitting display panel 100.

Particularly, the power supply 500 can change the level of the first voltage EVDD on the basis of the power control signal transferred from the control signal generating portion 420.

In this case, the level of the first voltage EVDD supplied to the entire pixels P can be changed, but only the level of the first voltage EVDD supplied to the specific pixel P can be changed.

For example, when a still image is output, the luminance of the entire light emitting display panel 100 is reduced and thus, the level of the first voltage EVDD supplied to all the pixels P of the light emitting display panel 100 can be changed.

In another example, when an image with a logo is output, only the luminance of light output only in the area with the logo can be reduced and thus, only the level of the first voltage EVDD supplied to specific pixels P in the area with the logo can be changed while the remaining pixels of the light emitting display panel 100 is maintained or unchanged.

Referring to FIG. 5, the gate driver 200 can be directly embedded into the non-display area NDA by using a gate-in panel (GIP) type, or can be provided in the display area DA in which light emitting devices ED are provided, or can be provided in a chip-on film attached in the non-display area NDA.

The gate driver 200 can supply the gate pulses GP1 to GPg to the gate lines GL1 to GLg.

When a gate pulse generated by the gate driver 200 is supplied to a gate of a switching transistor Tsw1 included in the pixel P, the switching transistor Tsw1 can be turned on. When the switching transistor is turned on, data voltage Vdata supplied through the data line can be supplied to the pixel P.

When a gate-off signal generated by the gate driver 200 is supplied to the switching transistor Tsw1, the switching transistor Tsw1 can be turned off. When the switching transistor Tsw1 is turned off, a data voltage may not be supplied to the pixel P any longer.

The gate signal GS supplied to the gate line GL can include the gate pulse GP and the gate-off signal.

In order to supply the gate pulses GP1 to GPg to the gate lines GL1 to GLg, the gate driver 200 can include stages ST1 to STg connected (e.g., respectively) to the gate lines GL1 to GLg, as illustrated in FIG. 5.

Each of the stages ST1 to STg can be connected to one gate line GL, but can also be connected to at least two gate lines GL.

In order to generate the gate pulses GP1 to GPg, a gate start signal VST and at least one gate clock GCLK generated by the control signal generating portion 420 can be transferred to the gate driver 200. For example, the gate start signal VST and at least one gate clock GCLK can be included in the gate control signals GCS.

One of the stages ST1 to STg can be driven by the gate start signal VST to output a gate pulse GP to the gate line GL. The gate pulse GP can be generated by the gate clock GCLK.

At least one of the signals outputted from the stage ST in which the gate pulse GP is output can be supplied to another stage ST to drive another stage ST. Accordingly, a gate pulse can be output in another stage ST. For example, the stages ST can be driven sequentially to supply the gate pulses GP to the gate lines GL sequentially.

One of the various types of gate drivers 200 currently used can be applied to the light emitting display apparatus according to the present disclosure, and the characteristics of the present disclosure are not in the structure and function of the gate driver 200. As such, a detailed description of the stage ST will be omitted or may be provided briefly.

Finally, the data driver 300 can supply data voltages Vdata to the data lines DL1 to DLd.

To this end, referring to FIG. 6, the data driver 300 can include a shift register 310 which outputs a sampling signal, a latch portion 320 which latches the image data Data received from the control driver 400, a digital-to-analog converter (DAC) 330 which converts the image data Data, transferred from the latch portion 320, into a data voltage Vdata and outputs the data voltage Vdata, and an output buffer 340 which outputs the data voltage, transferred from the digital-to-analog converter 330, to the corresponding data line DL on the basis of a source output enable signal SOE.

The shift register 310 can output the sampling signal by using the data control signals DCS received from the control signal generating portion 420. For example, the data control signals DCS transferred to the shift register 310 can include a source start pulse SSP and a source shift clock signal SSC.

The latch portion 320 can latch the pieces of image data Data sequentially received from the control driver 400 and can simultaneously output the pieces of image data Data to the digital-to-analog converter 330 on the basis of the sampling signal.

The digital-to-analog converter (DAC) 330 can simultaneously convert the pieces of image data Data, transferred from the latch portion 320, into data voltages Vdata and can output the data voltages Vdata.

The output buffer 340 can simultaneously output the data voltages Vdata, transferred from the digital-to-analog converter 330, to the data lines DL1 to DLd of the light emitting display panel 100 on the basis of the source output enable signal SOE transferred from the control signal generating portion 420.

To this end, the output buffer 340 can include a buffer 341 which stores the data voltage Vdata transferred from the digital-to-analog converter 330 and a switch 342 which outputs the data voltage Vdata, stored in the buffer 341, to the data line DL.

For example, when the switches 342 are turned on based on the source output enable signal SOE simultaneously supplied to the switches 342, the data voltages Vdata stored in the buffers 341 can be supplied to the data lines DL1 to DLd through the switches 342.

The data voltages Vdata supplied to the data lines DL1 to DLd can be supplied to pixels P connected to the gate line GL to which the gate pulse GP is supplied.

The features of the present disclosure are not to be focused merely in the structure and function of the data driver 300, and thus a detailed description of the specific structure and function of the data driver 300 will be omitted or may be briefly provided.

Figure 7:
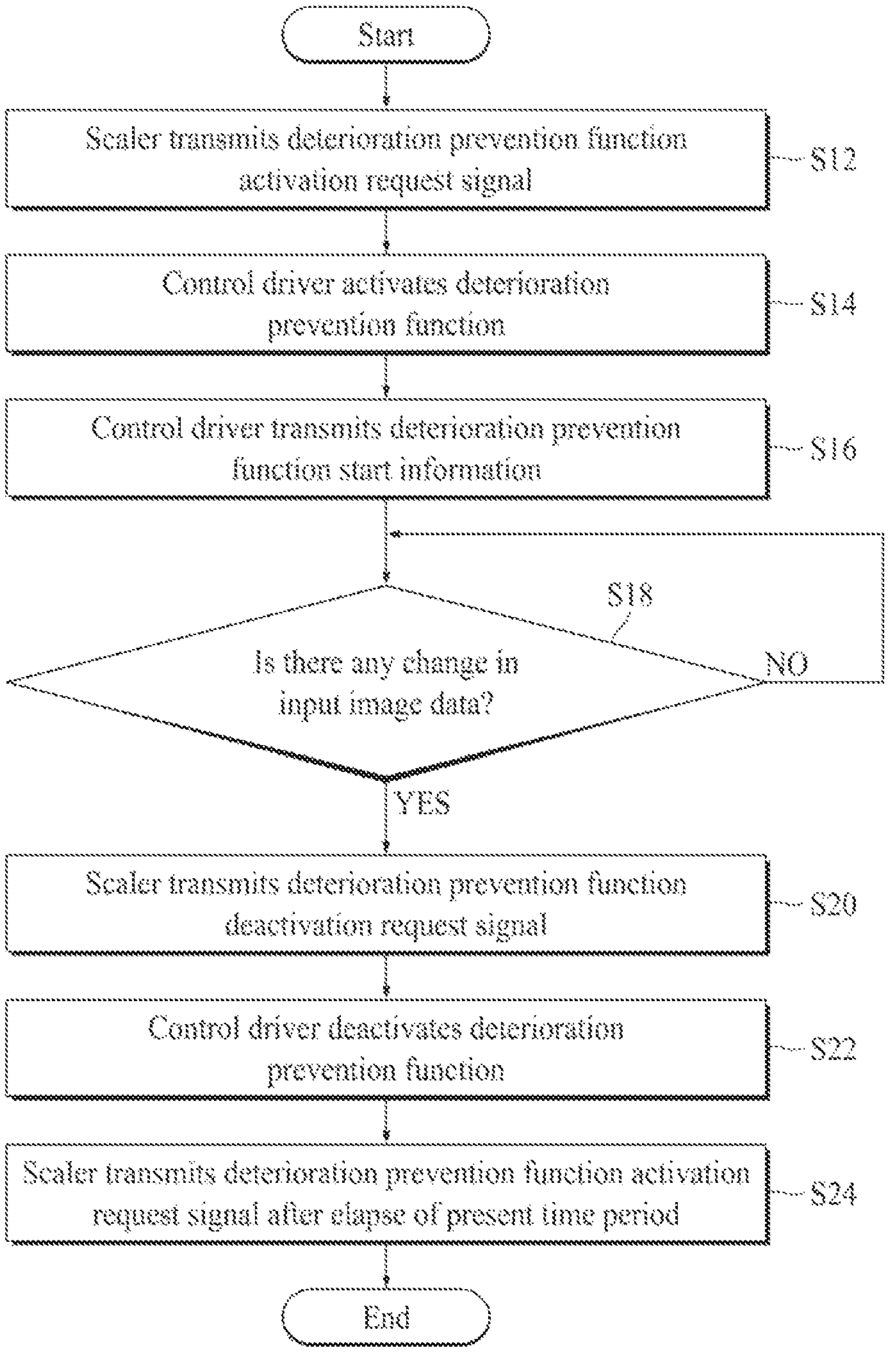
FIG. 7 is an exemplary diagram illustrating a driving method of a light emitting display apparatus according to one embodiment of the present disclosure.
Figure 8A:
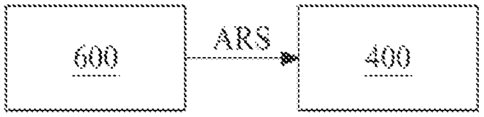
FIGS. 8A to 8C are diagrams illustrating signals transferred between a scaler and a control driver in a light emitting display apparatus according to one embodiment of the present disclosure.
Figure 8B:
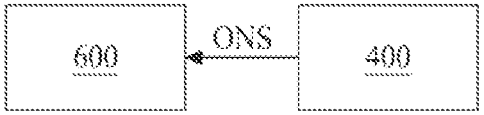
Figure 8C:
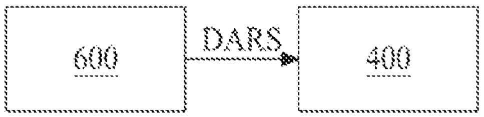
Figure 9:
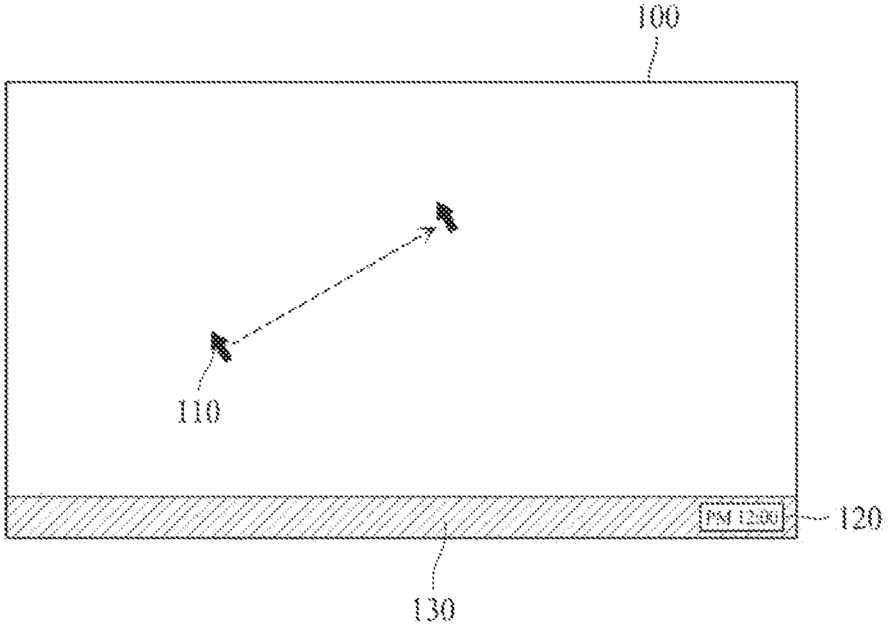
FIG. 9 is a view illustrating an example of a light emitting display panel applied to a light emitting display apparatus according to one embodiment of the present disclosure.

FIG. 7 is an exemplary diagram illustrating a driving method of a light emitting display apparatus according to one embodiment of the present disclosure, FIGS. 8A to 8C are exemplary diagrams illustrating signals transferred between a scaler and a control driver in a light emitting display apparatus according to one embodiment of the present disclosure, and FIG. 9 is an exemplary view illustrating a light emitting display panel applied to a light emitting display apparatus according to one embodiment of the present disclosure.

The same or similar contents as those described with reference to FIGS. 1 to 6 will be omitted or briefly described in the following description. The method of FIG. 7 (or of the present disclosure) can be performed by the light emitting display apparatus of FIGS. 1-6 and 9 (of the present disclosure).

Referring to FIG. 7, first, when power is supplied to the light emitting display apparatus, and the scaler 600 and the control driver 400 are driven, the analyzing portion 630 of the scaler 600 transfers a deterioration prevention function activation request signal ARS to the control driver 400 as shown in FIG. 8A (S12).

Then, when the deterioration prevention function activation request signal ARS is received, the control driver 400 activates a deterioration prevention function (S14). The activation of the deterioration prevention function can include performing an operation to analyze input image data Ri, Gi, and Bi in order to execute the deterioration prevention function.

For example, as described above, the control portion 410 of the control driver 400 analyzes the input image data Ri, Gi, and Bi and determines whether or not the input image data Ri, Gi, and Bi corresponding to a still image is inputted for a preset period (e.g., when a TPC function is executed). In addition, the control portion 410 analyzes the input image data Ri, Gi, and Bi and also determines whether or not the input image data Ri, Gi, and Bi corresponding to an image including a logo is inputted (e.g., when an LEA function is executed).

In an example, although the execution of both the TPC and LEA functions is preferred, at least one of the TPC and LEA functions can be performed.

For example, the control driver 400 can analyze the input image data Ri, Gi, and Bi in order to execute at least one of the TPC function, the LEA function, and other various deterioration prevention functions.

Then, if a luminance of the entire pixels P or a luminance of the pixels P corresponding to the logo area is reduced due to the execution of the deterioration prevention function, the control portion 410 transfers deterioration prevention function start information ONS to the scaler 600 as shown in FIG. 8B (S16).

For example, when the deterioration prevention function is activated in the control driver 400 by the deterioration prevention function activation request signal ARS received from the scaler 600, the control driver 400 analyzes the input image data Ri, Gi, and Bi. According to the analyzing results, when the luminance of the entire pixels P or the luminance of the pixels P corresponding to the logo is reduced (e.g., from the normal luminance level), the control driver 400 transfers the deterioration prevention function start information ONS to the scaler 600.

In addition, the control driver 400 analyzes the input image signals Ri, Gi, and Bi received from the scaler 600 when the deterioration prevention function activation request signal ARS is received. Based on the analyzing results of the input image data Ri, Gi, and Bi, if it is determined that the deterioration prevention function is applicable (for example, when it is determined that still images are output or images including the logo are output), then the control driver 400 reduces the luminance of the images output from the light emitting display panel 100 or reduces the luminance of the area in which the logo is displayed among the images output from the light emitting display panel 100. After the luminance of the image is reduced, the control portion 410 transfers the deterioration prevention function start information ONS to the analyzing portion 630 of the scaler 600. The deterioration prevention function start information ONS can include information or signals indicating that the deterioration prevention function has been activated, and/or the type of the deterioration prevention function that has been activated.

Then, when the deterioration prevention function start information ONS is received, the analyzing portion 630 analyzes current input image data Ri, Gi, and Bi received by the scaler 600 and determines whether there is a change in the input image data Ri, Gi, and Bi (S18).

For example, when the deterioration prevention function start information ONS is received from the control driver 400, the analyzing portion 630 analyzes an amount of change in the input image data Ri, Gi, and Bi and determines whether or not the luminance of the image reduced by the deterioration prevention function now needs to be increased to the luminance of the normal state.

In addition, when the control driver 400 analyzes the input image data Ri, Gi, and Bi to activate the deterioration prevention function (e.g., in step S14), the control driver 400 analyzes the input image data Ri, Gi, and Bi until the deterioration prevention function start information ONS is transferred to the scaler 600. Therefore, the analyzing of the input image data Ri, Gi, and Bi by the scaler 600 is performed in step S18 to determine if the deterioration prevention function needs to be deactivated.

That is, when the deterioration prevention function start information ONS is received by the scaler 600, the scaler 600 analyzes the input image data Ri, Gi, and Bi in order to determine whether or not the luminance of the image reduced by the deterioration prevention function needs to be increased back to the luminance of the normal state (e.g., whether or not the deterioration prevention function needs to be deactivated or turned off).

Then, based on the determination result (S18), if it is determined that the luminance of the image reduced by the deterioration prevention function does not need to be increased to the luminance of the normal state (i.e., "NO" in step S18), the analyzing portion 630 continuously performs the operation of determining the input image data Ri, Gi, and Bi in step S18.

While the analyzing portion 630 continuously performs the operation of determining the input image data Ri, Gi, and Bi, the luminance of the image outputted from the light emitting display panel 100 is maintained at a luminance smaller than the luminance corresponding to the input image data Ri, Gi, and Bi by the deterioration prevention function.

For example, for the output of the still image, when the light emitting elements ED continuously outputs light with a high luminance, the deterioration rate of the light emitting elements ED can be increased. However, in the light emitting display apparatus according to the present disclosure, since the deterioration prevention function is performed when the still image is outputted, the luminance of the light emitting elements ED can be reduced, thereby reducing the deterioration rate of the light emitting elements ED and lengthening the lifespan of the light emitting elements ED. Accordingly, the deterioration rate of the light emitting display apparatus can be reduced and the use of the light emitting display apparatus can be prolonged.

In addition, if the light emitting elements provided in a display area continuously outputs a logo with a high luminance, the deterioration rate of the light emitting elements provided in such area where the logo is displayed can increase, which might have bad influence on the light emitting display panel. However, in the light emitting display apparatus according to the present disclosure, the luminance of the light emitting elements ED provided in the image in which the logo is output can be reduced, thereby reducing the deterioration rate of the light emitting elements ED. Accordingly, the deterioration rate of the light emitting display apparatus can be reduced.

In a variation of the present disclosure, while the analyzing portion 630 performs the operation of analyzing the input image data Ri, Gi, and Bi, the control portion 410 can analyze the input image data Ri, Gi, and Bi and can determine whether there is a change in the input image data Ri, Gi, and Bi. For example, according to the present disclosure, the control portion 410 can continuously determine whether there is a change in the input image data Ri, Gi, and Bi for the deterioration prevention function regardless of the analyzing portion 630.

However, when the deterioration prevention function start information ONS is generated in the control portion 410, the control portion 410 can terminate the analysis of the input image data Ri, Gi, and Bi in connection with the deterioration prevention function. But, even if the analysis of the input image data Ri, Gi, and Bi in connection with the deterioration prevention function is terminated by the control portion 410, the function of reducing the luminance of the entire light emitting display panel 100 or the function of reducing the luminance of the area where the logo is displayed can be continuously performed.

Then, based on the determination result (S18), if it is determined that the luminance of the image reduced by the deterioration prevention function needs to be increased to the luminance of the normal state ("YES" in step S18), the analyzing portion 630 generates and transfers a deterioration prevention function deactivation request signal DARS to the control driver 400 as shown in FIG. 8C (S20).

For example, based on the determination result (S18), if it is determined that the input image data Ri, Gi, and Bi corresponding to the image without a video or logo is received, the analyzing portion 630 can generate and transfer a deterioration prevention function deactivation request signal DARS to the control driver 400 so as to start the deactivation or turning off of the deterioration prevention function.

For example, one purpose of the deterioration prevention function is to reduce the luminance of the image with a still image or logo in order to prevent the deterioration of the light emitting elements ED. Therefore, when an image other than a still image (e.g., input image data Ri, Gi, or Bi corresponding to a video or moving image) is received, or input image data Ri, Gi, and Bi corresponding to an image without a logo is received, then it may not be necessary to reduce the luminance of the image. Therefore, when it is determined that the input image data Ri, Gi, and Bi corresponding to the image without a video or logo is received, the deterioration prevention function deactivation request signal DARS for terminating the deterioration prevention function is generated by the scaler 600 and is transferred to the control driver 400 (S20).

In another example, based on the determination result (S18), if the change occurs in some images to be continuously output from the light emitting display panel 100, the analyzing portion 630 can generate and transfer the deterioration prevention function deactivation request signal DARS to the control driver 400 (S20). Herein, the change in some images can mean a change in a very small area of images to be outputted on the light emitting display panel 100. An example of such scenario will now be discussed referring to FIG. 9.

In one example, as shown in FIG. 9, when compared to the overall size of the light emitting display panel 100, the size of a mouse cursor 110 is very small.

That is, if the light emitting display apparatus is used as a monitor and is connected to a computer, the mouse can be moved by a user, whereby the mouse cursor 110 is shown on the light emitting display panel 100 and can be moved on the light emitting display panel 100. Since the size of the mouse cursor 110 is small, the area or path in which the mouse cursor 110 moves can be limited to a very narrow area or path.

In this scenario, in response to the receipt of the activation signal ARS, the control portion 410 of the control driver 400 compares the input image data Ri, Gi, and Bi included in at least two frames and checks for a change in the image to determine whether or not to activate the deterioration prevention function (e.g., in step S14 of FIG. 7). The frame can mean a period in which one image is output. In step S14, the control driver 400 is configured to determine whether the input image is a still image or video. Therefore, even if a motion is detected in a very small area, such as the movement of the mouse cursor 110, the control driver 400 does not determine the movement as the video. Thus, even if the movement of the mouse cursor 110 is sensed after the luminance of the image is reduced by executing the deterioration prevention function, the control driver 400 may not determine that the input image data Ri, Gi, and Bi corresponding to the video is received. As such, after the luminance of the image is reduced, even if the mouse cursor 110 is moved by the user (e.g., the user desires to view the light emitting display panel 100 in a full or normal luminance state), the luminance of the image on the light emitting display panel 100 may still be maintained in the reduced state. Accordingly, the user may see the image with a low luminance, which might cause inconvenience.

In order to address this issue, according to the present disclosure, the analyzing portion 630 of the scaler 600 can determine that the image is changed even when the change occurs in a portion of images to be continuously output from the light emitting display panel 100.

To this end, the amount of change in the image used to generate the deterioration prevention function deactivation request signal DARS by the analyzing portion 630 can be set to be smaller than the amount of change in the image used to terminate the deterioration prevention function by the control portion 410.

For example, when 50% or more of input image data Ri, Gi, and Bi among input image data Ri, Gi, and Bi corresponding to one image displayed on the entire light emitting display panel 100 changes (for example, when the amount of change detected in the image is 50% or more), the control portion 410 determines that the image is the video, to thereby increase or decrease the luminance.

On the other hand, when the input image data Ri, Gi, and Bi of 0.1% or more among the input image data Ri, Gi, and Bi corresponding to one image changes (for example, when the among amount of change detected in the image is 0.1% or more), the analyzing portion 630 determines that the image is changed, thereby generating the deterioration prevention function deactivation request signal DARS.

The amount of change in the image determined as the changed image by the analyzing portion 630 can be variously set in consideration of a mouse, a single character, or the like. For instance, a movement of a mouse, a character or input change by a keyboard, etc. can be considered a sufficient change in the image to trigger the generation of the DARS by the analyzing portion 630.

Therefore, according to the present disclosure, even when the change in a portion of images to be continuously output from the light emitting display panel 100 is a change caused by the movement of the mouse cursor 110, the deterioration prevention function deactivation request signal DARS can be generated.

That is, according to the present disclosure, the image change which cannot be sensed by the control driver 400 can be sensed by the scaler 600, whereby the deterioration prevention function can be deactivated.

Further, the change in a portion of the images to be continuously output can be a change caused by an output of a character according to an operation of a keyboard connected to the light emitting display panel 100. For example, even if a user inputs a character by using a keyboard in the state in which the luminance of the image is reduced by the deterioration prevention function, an area of displaying the character is rather very small and thus, the control portion 410 determines that the input image data Ri, Gi, and Bi corresponding to the still image is input, thereby continuously reducing the luminance of the image (i.e., the control portion 410 continues to reduce the luminance of the image and thus maintains the activation of the deterioration prevention function). In this state, however, the analyzing portion 630 can generate a deterioration prevention function deactivation request signal DARS even if the input image data Ri, Gi, and Bi is changed by a change in the character(s) in the very small area of the light emitting display panel 100. Accordingly, a user can increase the luminance of the image by using the keyboard to deactivate the deterioration prevention function in the present disclosure by the operation of the scaler 600.

In this case, in one example, the analyzing portion 630 can be configured not to generate the deterioration prevention function deactivation request signal DARS when the change in the image occurs in a predetermined specific area among the entire areas of the light emitting display panel 100. Herein, the specific area can be an area which is not affected or covered by the deterioration prevention function. For example, as illustrated in FIG. 9, an area in which a clock 120 is displayed may not be affected by the deterioration prevention function.

For example, when the light emitting display apparatus is used as a monitor to a computer or other device, as shown in FIG. 9, the computer can output a work display line 130 at a lower end of the light emitting display panel 100, and a clock 120 changed at a predetermined interval can be displayed on the work display line 130.

The analyzing portion 630 of the scaler 600 of the display apparatus can be provided with information on the position of the work display line 130 or information on the position of the clock 120 from the computer, or can obtain information on the position at which the work display line 130 is displayed and information on position at which the clock 120 is displayed by using a method for detecting the logo by the control portion 410.

When the luminance of the image is reduced by the deterioration prevention function executed by the control driver 400, the luminance of the area where the work display line 130 and the clock 120 are located is reduced.

In this case, as described above, the amount of change in the image used to generate the deterioration prevention function deactivation request signal DARS by the analyzing portion 630 is smaller than the amount of change in the image used to terminate the deterioration prevention function by the control portion 410. Accordingly, when the clock 120 changes in units of seconds or minutes, the deterioration prevention function deactivation request signal DARS can be generated by the analyzing portion 630. In order to prevent this from occurring, the analyzing portion 630 can be configured not to generate the deterioration prevention function deactivation request signal DARS when the change of image occurs in a predetermined specific area among the entire areas of the light emitting display panel 100.

The predetermined specific area can be an area in which the work display line 130 is displayed, as described above, and can be an area in which the clock 120 is displayed.

Next, referring back to FIG. 7, when the deterioration prevention function deactivation request signal DARS is received from the scaler 600, the control driver 400 deactivates (e.g., turns off) the deterioration prevention function (S22).

Since the deterioration prevention function is not executed when the deterioration prevention function is deactivated, the control driver 400 outputs images having the luminance corresponding to the input image data Ri, Gi, and Bi through the light emitting display panel 100.

To this end, the control portion 410 can control at least one of the data aligning portion 430 and the control signal generating portion 420 so that the luminance of the image reduced by the deterioration prevention function can be increased back to the luminance of the normal state/level.

For example, under the control of the control portion 410, the data aligning portion 430 can generate image data having the same or similar level of luminance as that of the luminance of the input image data Ri, Gi, and Bi and can transfer the image data to the data driver 300.

Further, under the control of the control portion 410, the control signal generating portion 420 can generate a power control signal for increasing the level of the first voltage EVDD previously reduced and can supply the increased power control signal to the power supply 500.

Accordingly, the entire luminance of the light emitting display panel or the luminance of the logo area can be increased to the luminance corresponding to the input image data Ri, Gi, and Bi.

In this case, as described above, when the deterioration prevention function is deactivated, the deterioration prevention function is not executed or performed by the control driver 400. For example, even if a still image is output again after the increase in the luminance of the image, the luminance of the still image is not reduced.

Finally, as discussed above, the analyzing portion 630 can transfer the deterioration prevention function deactivation request signal DARS to the control driver 400 in step S20. Thereafter (e.g., after step S22), after a preset period elapses, the analyzing portion 630 can transfer a deterioration prevention function activation request signal ARS to the control driver 400 again, as shown in FIG. 8A. Accordingly, the control driver 400 can perform the deterioration prevention function again (S24).

That is, as described above, when the deterioration prevention function is deactivated, the deterioration prevention function is not executed (or is stopped) by the control driver 400, whereby the luminance of the still image is not reduced even if the still image is output again after the increase in luminance of the image.

To prevent this, in the present disclosure, when a preset period elapses after the deterioration prevention function deactivation request signal DARS is transferred to the control driver 400, the analyzing portion 630 can transfer a deterioration prevention function activation request signal ARS to the control driver 400 again. Herein, for example, the preset period can be several to hundreds of frames or several seconds.

When the deterioration prevention function activation request signal ARS is received, the control driver 400 and the scaler 600 can repeatedly perform processes (S12 to S24) as described above.

Accordingly, the deterioration prevention function can be continuously performed in the light emitting display apparatus, and the deterioration prevention function of the control driver 400 can be selectively controlled through the scaler 600.

That is, after the elapse of the preset time period, when the deterioration prevention function activation request signal ARS is received from the scaler 600, the control driver 400 can analyze the input image signals received from the scaler 600 and can change the luminance of the images outputted from the light emitting display panel 100 according to the result of analyzing the input image signals.

As described above, in the light emitting display apparatus according to the present disclosure, in order to control the deterioration prevention function of the control driver 400 by the scaler 600, a deterioration prevention function start signal/information ONS can be transferred from the control driver 400 to the scaler 600. Therefore, in one example, when the control driver 400 of the display apparatus manufactured as a television is used as a monitor, the control driver 400 can be modified only slightly, e.g., by providing a program or application for generating and transferring the deterioration prevention function start signal/information ONS.

Therefore, the control driver 400 manufactured for a television can be easily adapted and used as a monitor, whereby the use of the control driver 400 can be extended.

In one example, in the light emitting display apparatus according to the present disclosure, instead of the control driver 400 which does not detect the small change in images, the scaler 600 can sense a small change such as the movement of the mouse cursor 110. Therefore, even if the control driver 400 is applied to the light emitting display apparatus as a monitor, which distinguishes the still image and video or distinguishes the image including the logo, the deterioration prevention function can be properly and effectively performed.

That is, according to the present disclosure, even if there is no design change to the control driver 400 for performing the deterioration prevention function, the control driver 400 previously used to perform the deterioration prevention function can be applied to the light emitting display apparatus as the monitor as is or with a slight modification.

Therefore, according to the present disclosure, manufacturing costs of the light emitting display apparatus can be reduced.

According to an embodiment of the present disclosure, even when a structure and function of a control driver in which the deterioration prevention function is executed are not changed, the deterioration prevention function of the control driver can be deactivated.

Therefore, a light emitting display apparatus equipped with a control driver designed to ignore small movements such as a movement of a mouse cursor can be used as a monitor.

For example, according to an embodiment of the present disclosure, a light emitting display apparatus which is made for a television and executes a deterioration prevention function can also be used as a monitor and other various types of electronic devices.

Moreover, according to an embodiment of the present disclosure, the luminance of the light emitting display apparatus can be reduced by the deterioration prevention function, and thus, a low-power light emitting display apparatus can be provided.

According to an aspect of the present disclosure, an electronic apparatus is provided, which includes a light emitting display panel configured to display image, at least one driver configured to drive the light emitting display panel, a control driver configured to supply image data to the at least one driver, and activate a deterioration prevention function on the light emitting display panel, and a scaler configured to analyze image data input thereto, determine a change in the image data, and transmit a deterioration prevention function deactivation request signal to the control driver when the change in the input image data is determined to be equal to or greater than a reference value.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A light emitting display apparatus comprising:

a control driver configured to perform a deterioration prevention function;

a scaler configured to transmit a deterioration prevention function activation request signal to the control driver, and transmit a deterioration prevention function deactivation request signal to the control driver based on an analysis result of input image data when deterioration prevention function start information is received from the control driver; and a light emitting display panel configured to display images under control of the control driver, wherein after a preset period elapses since the scaler has transmitted the deterioration prevention function deactivation request signal to the control driver, the scaler transmits another deterioration prevention function activation request signal to the control driver.

2. The light emitting display apparatus according to claim 1, wherein the control driver analyzes input image signals received from the scaler when the deterioration prevention function activation request signal is received, the control driver reduces a luminance of images output from the light emitting display panel or reduces a luminance of only a specific area on the light emitting display panel when it is determined that the deterioration prevention function is to be executed based on the analysis result of the input image signals, and the control driver transmits the deterioration prevention function start information to the scaler when the deterioration prevention function is executed.

3. The light emitting display apparatus according to claim 1, wherein the scaler transmits the deterioration prevention function deactivation request signal to the control driver when it is determined that a change occurs in a portion of images to be continuously output from the light emitting display panel.

4. The light emitting display apparatus according to claim 3, wherein the change in the portion of the images to be continuously output is a change caused by a movement of a mouse cursor.

5. The light emitting display apparatus according to claim 3, wherein the change in the portion of the images to be continuously output is a change associated with a character or a key on a keyboard.

6. The light emitting display apparatus according to claim 1, wherein an amount of change in an image used to generate the deterioration prevention function deactivation request signal in the scaler is smaller than an amount of change in an image used to terminate the deterioration prevention function by the control driver.

7. The light emitting display apparatus according to claim 1, wherein the scaler does not generate the deterioration prevention function deactivation request signal when a change in an image occurs in a predetermined specific area among an entire display area of the light emitting display panel.

8. The light emitting display apparatus according to claim 7, wherein the specific area is an area which is not affected by the deterioration prevention function.

9. The light emitting display apparatus according to claim 1, wherein the control driver analyzes input image signals received from the scaler when the another deterioration prevention function activation request signal is received after the preset period has elapsed, and changes a luminance of images output from the light emitting display panel according to results of analyzing the input image signals.

10. The light emitting display apparatus according to claim 1, wherein the scaler includes:

an image information receiving portion configured to receive image information;

a converting portion configured to convert the image information into the input image data; and an analyzing portion configured to generate and transmit the deterioration prevention function activation request signal to the control driver, and generate and transmit the deterioration prevention function deactivation request signal to the control driver according to the analysis result of the input image data when the deterioration prevention function start information is received from the control driver.

11. The light emitting display apparatus according to claim 1, wherein the light emitting display apparatus is a television configured to be used as a monitor to another electronic device when the another electronic device is coupled with the light emitting display apparatus.

12. The light emitting display apparatus according to claim 1, wherein the scaler transmits the deterioration prevention function deactivation request signal to the control driver when a change in the input image data is determined to be equal to or greater than a reference value, and wherein the reference value is 0.1% of the input image data corresponding to one image.

13. An electronic apparatus comprising:

a display panel configured to display images;

at least one driver configured to drive the display panel;

a control driver configured to supply image data to the at least one driver, and activate a deterioration prevention function on the display panel; and a scaler configured to analyze image data input thereto, determine a change in the image data, and transmit a deterioration prevention function deactivation request signal to the control driver when the change in the input image data is determined to be equal to or greater than a reference value, wherein the control driver starts the analyzing of the image data input thereto in response to a deterioration prevention function activation request signal received from the scaler, and wherein after a predetermined time period has elapsed since the transmission of the deterioration prevention function deactivation request signal to the control driver, the scaler regenerates and transmits another deterioration prevention function activation request signal to the control driver.

14. The electronic apparatus according to claim 13, wherein the control driver analyzes image data input thereto and activates the deterioration prevention function when the image data input thereto corresponds to a still image and/or an image including a logo.

15. The electronic apparatus according to claim 13, wherein the deterioration prevention function is a temporal peak luminance control (TPC) function or a logo extraction algorithm (LEA) function.

16. The electronic apparatus according to claim 13, wherein the change in the input image data determined by the scaler includes a change in a movement of a cursor displayed on the display panel or a character associated with the display panel.

17. The electronic apparatus according to claim 13, wherein the change in the input image data determined by the scaler excludes a change made to a specified display area on the display panel or a change made to a clock displaying area on the display panel.

18. The electronic apparatus according to claim 13, wherein the reference value is 0.1% of the input image data corresponding to one image.

19. An electronic apparatus comprising:

a display panel configured to display images;

at least one driver configured to drive the display panel;

a control driver configured to supply image data to the at least one driver, and activate a deterioration prevention function on the display panel; and a scaler configured to analyze image data input thereto, determine a change in the image data, and transmit a deterioration prevention function deactivation request signal to the control driver when the change in the input image data is determined to be equal to or greater than a reference value, wherein the reference value is 0.1% of the input image data corresponding to one image.

* * * * *